US010225260B2

(12) United States Patent
Gabriel et al.

(10) Patent No.: US 10,225,260 B2
(45) Date of Patent: *Mar. 5, 2019

(54) ENHANCED AUTHENTICATION SECURITY (71) Applicant: MicroStrategy Incorporated, Vienna, VA (US)

(72) Inventors: Gary Gabriel, Annandale, VA (US); Sergey Mironenko, Ellicott City, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/971,379

(22) Filed: May 4, 2018

(65) Prior Publication Data

US 2018/0255066 A1 Sep. 6, 2018

Related U.S. Application Data (63) Continuation of application No. 15/006,212, filed on Jan. 26, 2016, now Pat. No. 9,967,260.

(60) Provisional application No. 62/108,007, filed on Jan. 26, 2015.

(51) Int. Cl.
*H04L 29/06* (2006.01)

(52) U.S. Cl.
CPC ........ *H04L 63/102* (2013.01); *H04L 63/0876* (2013.01)

(58) Field of Classification Search
CPC ....... H04L 63/08; H04L 63/10; H04L 63/102; H04L 63/0876; G06F 21/31
USPC ...................... 726/2–7, 27–30; 713/168–170
See application file for complete search history.

(56) References Cited

U.S. PATENT DOCUMENTS

| 6,199,113 | B1 | 3/2001 | Alegre |
| 6,539,479 | B1 | 3/2003 | Wu |
| 6,886,095 | B1 * | 4/2005 | Hind .................. H04L 63/0823 713/168 |
| 7,581,244 | B2 * | 8/2009 | Li ........................... H04L 63/06 380/277 |
| 7,805,606 | B2 | 9/2010 | Birger |
| 8,073,777 | B2 * | 12/2011 | Barry .................. G06F 11/0709 370/389 |
| 8,086,847 | B2 * | 12/2011 | Singh .................... H04L 9/3273 713/151 |
| 8,243,928 | B2 * | 8/2012 | Park ...................... G06F 21/445 380/247 |
| 8,422,650 | B2 * | 4/2013 | Kutt ....................... H04L 51/04 370/352 |
| 8,474,028 | B2 | 6/2013 | Kulkarni |
| 8,555,345 | B2 | 10/2013 | Torvinen |
| 9,083,533 | B2 | 7/2015 | Ronda |
| 9,967,260 | B1 * | 5/2018 | Gabriel .............. H04L 63/0876 |

* cited by examiner

*Primary Examiner* — Hosuk Song
(74) *Attorney, Agent, or Firm* — Fish & Richardson P.C.

(57) ABSTRACT

Systems, methods, and apparatus, including computer-readable storage media storing executable instructions, for enhanced authentication security. In some implementations, an authentication request associated with a first communication session is received. A second communication session having parameter values derived from parameter values for the first communication session. An authorization code corresponding to the second communication session is generated. The first communication session as closed. The authentication code is provided to the device in response to the authentication request.

20 Claims, 6 Drawing Sheets

ENHANCED AUTHENTICATION SECURITY

CROSS-REFERENCE TO RELATED APPLICATIONS

This application is a continuation of U.S. application Ser. No. 15/006,212, filed Jan. 26, 2016, and issued as U.S. Pat. No. 9,967,260, which claims the benefit of U.S. Provisional Application Ser. No. 62/108,007, filed on Jan. 26, 2015. Both of these prior applications are incorporated by reference in their entirety.

TECHNICAL FIELD

This disclosure relates to user authentication.

BACKGROUND

A system may authenticate a user in any of a variety of ways, for example, using a username and password that the user enters, or through another code. Attackers frequently attempt to gain unauthorized access to user accounts.

SUMMARY

In some implementations, various measures can be taken to maintain the integrity of an authentication process and avoid intrusion by an attacker. For example, a credential management system registers an application or device by placing a registration cookie or other data on the device. When a device or application attempts to authenticate for a credential but is not associated with an appropriate registration cookie, the credential management system may require additional confirmation or other verification in order to reduce the risk of an attack. As another example, when a request for authentication is received, a credential management system may create a new, more secure communication session for the authentication to proceed.

In one general aspect, a computer-implemented method comprises: receiving, from a device, an authentication request that is associated with a first communication session having a set of parameter values; determining, based on the authentication request, that a new communication session should be created; in response to determining that a new communication session should be created, creating a second communication session that includes parameter values derived from the parameter values for the first communication session; generating an authorization code corresponding to the second communication session; designating the first communication session as closed; and providing the authentication code to the device in response to the authentication request.

Implementations may include one or more of the following features. The method may include designating a time limit for use of the authorization code; and storing the authorization code in association with the second communication session. The method may include receiving, from the device, a request that includes the authorization code; determining that the authorization code corresponds to the second communication session; determining that the time limit for use of the authorization code has not expired; and in response to determining that the authorization code corresponds to the second communication session and determining that the time limit for use of the authorization code has not expired, transmitting, to the device, a session cookie corresponding to the second communication session and redirect data configured to redirect the device to the second communication session. The method may include: based on authentication data received from the device, validating the credential of the user and designating the second communication session an authenticated communication session. The method may include: before the end of the time limit for use of the authorization code, invalidating the authorization code in response to receiving the request that includes the authorization code.

Implementations may include one or more of the following features. Receiving the authentication request includes receiving an authentication request has a referring IP address, and the authentication request indicates the set of parameter values and a referring IP address for the first communication session; creating the second communication session that includes the parameter values derived from the parameter values for the first communication session includes creating a second communication session that (i) includes the same parameter values as the first communication session and (ii) sets a referring IP address of the second communication session to be the referring IP address of the authentication request. The method may include: after receiving the request including the authorization code, comparing an IP address of the request that includes the authorization code with the referring IP address for the second communication session; and determining, based on the comparison, that the referring IP address of the request that includes the authorization code matches the referring IP address for the second communication session. Transmitting, to the device, the session cookie corresponding to the second communication session and the redirect data configured to redirect the device to the second communication session is further based on determining that the referring IP address of the request that includes the authorization code matches the referring IP address for the second communication session.

Implementations may include one or more of the following features. Determining that a new communication session should be created includes: determining that a value in the request indicates that a new communication session should be created. Determining that the value in the request indicates that a new communication session should be created includes: determining that the value in the request indicates that an application includes functionality needed to support a switch to a new communication session. The authentication request is associated with a credential of a user, and the method may include associating the credential of the user with the second communication session. The credential of the user is a particular credential of multiple credentials of the user; and the method may include storing data that associates the particular credential with the second communication session. The authentication request is a Security Assertion Markup Language (SAML) request.

In another general aspect, a computer-implemented method comprises: receiving, at a first application of a device, an authentication request from a second application of the device, the authentication request indicating parameter values for a first communication session of the device; generating, by the first application, a modified authentication request by adding or changing a particular parameter value, the particular parameter value indicating that a new communication session should be initiated for the device; transmitting the modified authentication request to a server system; receiving, from the server system and in response to transmitting the modified authentication request, an authorization code corresponding to a second communication session; generating, by the first application, a message that includes the authorization code; and providing the message that includes the authorization code to the second application.

Implementations may include one or more of the following features: determining, by the first application, that the second application is one of a predetermined set of applications; wherein generating the modified application request is performed in response to determining that the second application is one of the predetermined set of applications. Generating the message that includes the authorization code comprises generating, by the first application, a URL that includes the authorization code and indicates an address hosted by the server system. Providing the message that includes the authorization code to the second application comprises: providing, by the first application, the generated URL to the second application; initiating a switch in focus from the first application to the second application; and initiating navigation of the second application to the generated URL. Determining that the second application is one of a predetermined set of applications comprises: determining that the device switched from the second application to the first application; obtaining an identifier for the second application; determining that the identifier for the application matches one of a predetermined set of identifiers indicating that the corresponding application is a web browser; and determining that the second application is one of a predetermined set of applications based on determining that the identifier for the application matches one of the predetermined set of identifiers indicating that the corresponding application is a web browser. The authentication request comprises a SAML authentication request. Generating the message that includes the authorization code comprises generating a message comprising information allowing the second application to initiate communication with the server system over the second communication session. Generating the message that includes the authorization code comprises generating a message comprising information causing the second application to switch from using the first communication session to using the second communication session. Receiving the authentication request comprises receiving an authentication request for a single sign on service, the request being initiated by an application or web page.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more implementations are set forth in the accompanying drawings and the description, below. Other potential features of the disclosure will be apparent from the description and drawings, and from the claims.

DETAILED DESCRIPTION

In some implementations, various measures can be taken to maintain the integrity of an authentication process and avoid intrusion by an attacker. An attacker may set up a malicious website, for example, one that falsely purports to be the website of a service provider. If a victim into authenticates for the malicious site, the attacker may capture the user's information and/or obtain an authenticated communication session with the service provider. When a single sign-on (SSO) system is used, an attacker may attempt to use proxies, redirects, and other attacks in a relay attack or man in the middle attack to obtain unauthorized access.

In some implementations, a credential management system registers an application or device by placing a registration cookie or other data on the device. When a device or application attempts to authenticate for a credential but is not associated with an appropriate registration cookie, the credential management system may require additional confirmation or other verification in order to reduce the risk of an attack.

In some implementations, when a request for authentication is received, a credential management system may create a new, more secure communication session for the authentication to proceed. The credential management system may cooperate with a credential application on the device requesting authentication to transition from an existing communication, which may have been compromised by an attacker, to a new communication session where the authentication can proceed.

Figure 1:
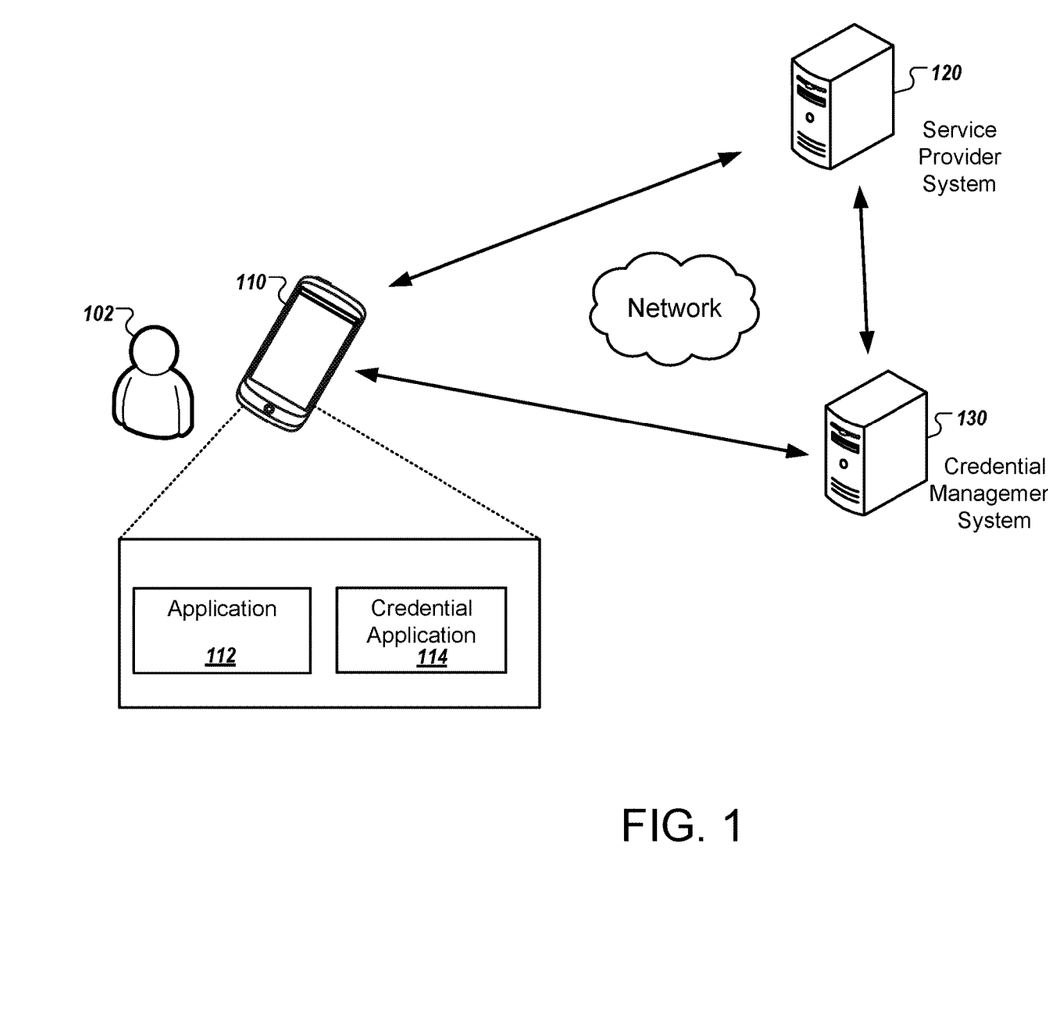
FIG. 1 illustrates an example of a system for authenticating a user.

FIG. 1 illustrates an example of a system 100 for authenticating a user. The system includes a client device 110, which may be, for example, a smart phone, a tablet computer, a wearable computer, a desktop computer, a notebook computer, a navigation device, or other electronic device. The client device 110 has a first application 112 installed, which may be a web browser, an application that can access Internet content through a WebView, or another application. The client device 110 also has a credential application 114 installed. The credential application 114 may permit a user to access one or more of the user's credentials, which may be provided by different credential granting authorities. The credential application 114 may enable single sign on (SSO) capabilities. For example, the credential application 114 may allow a user to access independent software programs or website, with a single log-in or authentication action.

The system 100 also includes a service provider system 120 which may provide access to one or more web pages or services that require authentication to access. The system 100 also includes a credential management system ("CMS") 130 that communicates with the credential application 114 to facilitate authentication of users and secure management of credentials. The client device 110, the service provider system 120, and the CMS 130 may each communicate over a network, such as the Internet.

In some implementations, a typical authentication process may involve the user 102 of the client device 110 visiting a first "log in" web page for the service provider system 120 using the application 112. The service provider system 120 may provide, to the client device 110, a redirect to a second log in page provided by the CMS 130, as well as a SAML authentication request. The client device 110 visits the second log in page (of the CMS 130), through which the CMS 130 may provide a code, such as a QR code that the CMS 130 generates, that corresponds to a particular session. If the user 102 is authenticating at a mobile device, the mobile device can switch from the application 112 to the credential application 114 and provide the code to the credential application 114, for example, in a URL. Alternatively, the client device 110 can display or otherwise output the code, and another device can detect the code with a credential application 114. The credential application 114, whether on the client device 110 or another device, then provides the code to the CMS 130 which can verify that the code is the same code corresponding to the session, and can authenticate the session to allow access to the services of the service provider system 120. In some instances, however, an attacker may attempt to trick a user into authenticating at a malicious web site in an attempt to obtain unauthorized access to an authenticated session.

To mitigate attacks, a particular browser, application, or device can be registered with the credential management system 130. For example, the registration of the client device 110 may include storing an identifier, such as a registration cookie or other value, at the client device 110. The identifier can be persistent across multiple different communication sessions after a device or application is registered with the CMS 130. When the CMS 130 detects that the client device 110 has the appropriate registration identifier for the user and badge being authenticated, registration proceeds normally. If the client device 110 does not have the appropriate registration cookie, however, the CMS 130 may disallow authentication of a session until the user provides further confirmation or verification of the user's identity.

As an example, the CMS 130 can place a registration cookie in a browser. In the following example, the application 112 is described to be a web browser, but the application 112 may alternatively be another type of application. For example, the application 112 may be an application with an embedded WebView. The first time the user 102 requests login from a browser, the CMS 130 detects that there is no registration cookie on the client device 110, and the CMS 130 will request that the user confirm the authentication. In some implementations, confirmation is requested after receiving authentication data, such as in response to receiving a scan of a QR code or entry of a password, but before authenticating the user's session. In other implementations, confirmation is requested before the user 102 enters or is permitted to enter authentication data.

Figure 2:
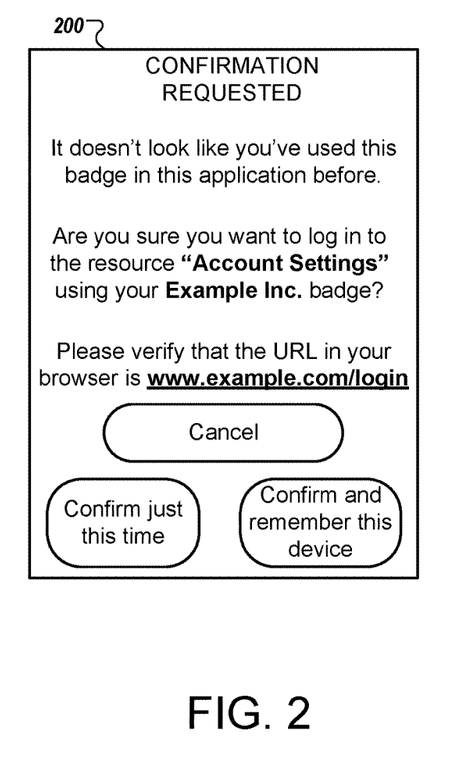
FIG. 2 illustrates an example of a user interface for confirming an authentication.

FIG. 2 shows an example of a user interface 200 that the credential application 114 may display at the client device 110 to request confirmation from the user 102. For example, in the user interface 200, the credential application 114 may indicate that it appears that the user 102 has not used the particular badge in this browser or app before. The user interface 220 may indicate the name of the resource (e.g., "Account Settings" web page) for which access is attempted, as well as the particular badge or organization (e.g., the badge for "Example Inc.") that is attempting to be used.

If the user is using a web browser, the user interface 200 can include a message instructing the user to verify that the URL of the login page and make sure it matches a particular URL or originates from a particular domain. The messages and structure of the user interface 200 may be configurable for each badge or organization. For example, the credential application 114 can communicate with the application 112 and/or the CMS 130 to determine which URL/domain should be shown, since different implementations may have a different URL. The confirmation dialog may include multiple confirmation options. One may allow a user to confirm the authentication for a single session (e.g., "Confirm just this time") and another can allow confirmation for future sessions using the same badge and application 112 (e.g., "Confirm and remember this device").

Figure 3:
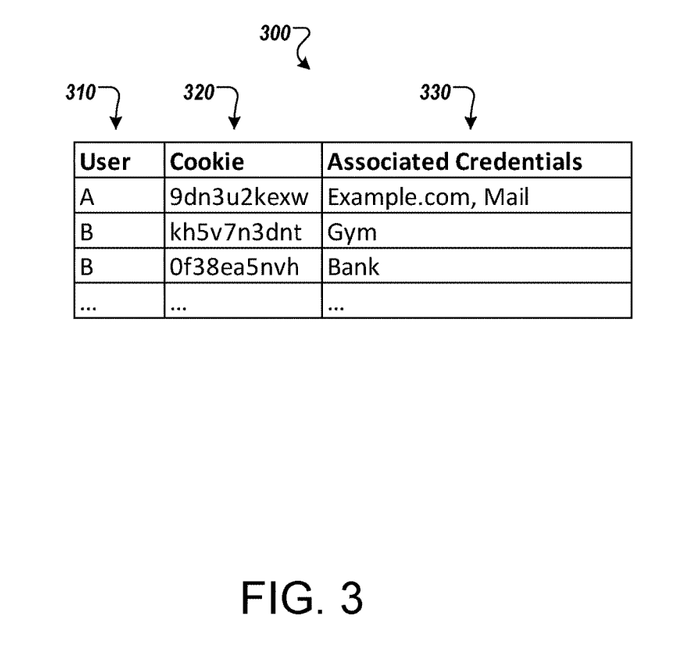
FIG. 3 illustrates an example of data stored by a credential management system.

Once the user confirms, the CMS 130 will authenticate the login session using the appropriate badge. If the user selected to remember this device (e.g., tapped "Confirm and remember this device"), then the CMS 130 will also create a browser registration cookie associated with that badge, and return that cookie to the browser. Each registration cookie can be a random string, for example, generated the same way that session cookies are generated. The CMS 130 also stores the browser registration cookies, as shown in FIG. 3. For example, the CMS 130 can store the browser registrations cookies 320 and information indicating which user 310 each registration cookie corresponds to. The CMS 130 can also store data indicating which of the user's badges 330 the user has confirmed with the application 112. In some implementations, the CMS 130 may use multiple tables to save information about the browser registration cookies, for example, one table to save the cookies themselves, and one table to save a list of badges associated with each cookie. The CMS 130 may compare information for various authentication actions with the stored data to look up whether an appropriate registration cookie exists, as well as what credentials or user it corresponds to.

Each time a user confirms a login with a new badge from a given application, that badge will be associated with the registration cookie for that application. As a result, a particular application 112 may be registered for a subset of the user's badges, which may include one or multiple of the user's badges but not all of the user's badges. Since different applications on the client device 110 have different registration cookies, the different applications may be registered for different sets of badges.

Subsequent logins from the same application 112 using the same badge will no longer require user confirmation if the user indicated to remember this device. The client device 110 will send the registration cookie to the CMS 114 with the login request, and the CMS 130 can make sure that authentication is occurring with one of the badges associated with that registration cookie. If a registration cookie is sent, but the authentication is for a different badge, then the CMS 130 will ask for confirmation from the user before proceeding, thus allowing the user to avoid potential attacks.

Additional techniques can be used to block attacks. When a user is using a web browser of a mobile device, and the credential application 114 is installed on the mobile device, authentication requests from the web browser may trigger the initiation of a new, secure communication session. As discussed below, the authentication may occur for the new session so that even if the prior session was compromised through a relay attack or a malicious web page, the attacker cannot gain access to the new session.

In some implementations, the user 102 of the client device 110 uses the application 112 to navigate to a web page that the user 102 would like to log in to. The user initiates the log in process at the web page, which causes the operating system of the client device 110 to open the credential application 114 and switch focus from the application 112 to the credential application 114. The application 112 sends an authentication request, such as an SAML authentication request, which is received by the credential application 114.

When the credential application 114 is opened, the credential application 114 can determine whether it was switched to from a browser, and if so, which browser prompted the switch. In some implementations, the credential application 114 obtains a bundle ID or other identifier that identifies the application 112 that was used prior to the switch to the credential application 114. The credential application 114 can store a list of identifiers of various browsers or other applications that support the appropriate functionality for carrying out the secure authentication process. The required functionality may include, for example, the ability to open a specific URL with a deep link. The identifiers can be fixed identifiers for applications, for example, identifiers that are the same for each instance of the application on different devices for a given platform or operating system.

If the credential application 114 determines that the user switched from a supported browser, then the credential application 114 adds or modifies a new session parameter (e.g., sets a parameter "new_session" to have a value of "1" or similar) to the authentication request received from the application 112. The credential application 114 sends the modified authentication request to the CMS 130, instead of forwarding the original authentication request from the application 112. The added or modified parameter can trigger the formation of a new communication session with the application 112.

When the authentication request includes the new session parameter, the CMS 130 will create a new session that is a copy of the original session, except for the requesting IP address, which is be set to be the IP address of the modified authentication request. The CMS 130 will then add the user's badge to the new session, create a short-lived authorization code for the new session, and mark the old session as "closed". The CMS 130 also stores this short-lived authorization code associated with the new session.

In order to use the short-lived authorization code, the CMS 130 will store all the requesting parameter values from the original login web page (SAML authentication request, etc.) along with the original session, and copy the requesting parameter values to the new session. The CMS 130 will also have a particular web page or address that receives the short-lived authorization code as a parameter. In response to the application 112 navigating to the particular page and providing the authorization code, the CMS 130 identifies the session associated with the received authorization code, verifies that the requester's IP address is the same as in the identified session, invalidates the authorization code so it cannot be used again. The CMS 130 then returns, to the requesting application 112, (i) a cookie with the identified session (overwriting the old session cookie if any), and (ii) a redirect to the login page having all the same parameters that were in the original request. This will allow a browser to exchange the authorization code for a new session and finish the login request in a secure manner with the new session.

After creating the new session, the CMS 130 responds to the credential application 114 by providing the short-lived authorization code. The credential application 114 then generates a URL that refers to the CMS 130 and includes the authorization code. The credential application 114 and switches to the original browser and directs it to URL for the CMS 130, which has the authorization code. In some instances, this causes the browser to open a new tab to communicate with the CMS 130. The browser will then exchange the authorization code for a new session, and log the user in. Since the URL is constructed by the credential application 114, we can reduce the risk that there is an attacker in the middle between the application 112 and the CMS 130.

Since the session cookie is shared among all browser tabs, the old tab will now be making /sso/wait requests using the new session but will use data from with an old QR code, which won't match the new session. The CMS 130 can look up the QR code (e.g., data that was extracted from encoded in the QR code) and see that it's for a "closed" session, and return data to the browser to make it close the tab. Now the user's original login tab is closed, and they are logged in in a new tab. If the user was under attack, then the attacker has the old session, which is now closed, and the attacker never sees the new session.

FIGS. 4A-4D illustrate an example of interactions of the system 100 that may complete an authentication.

Figure 4A:
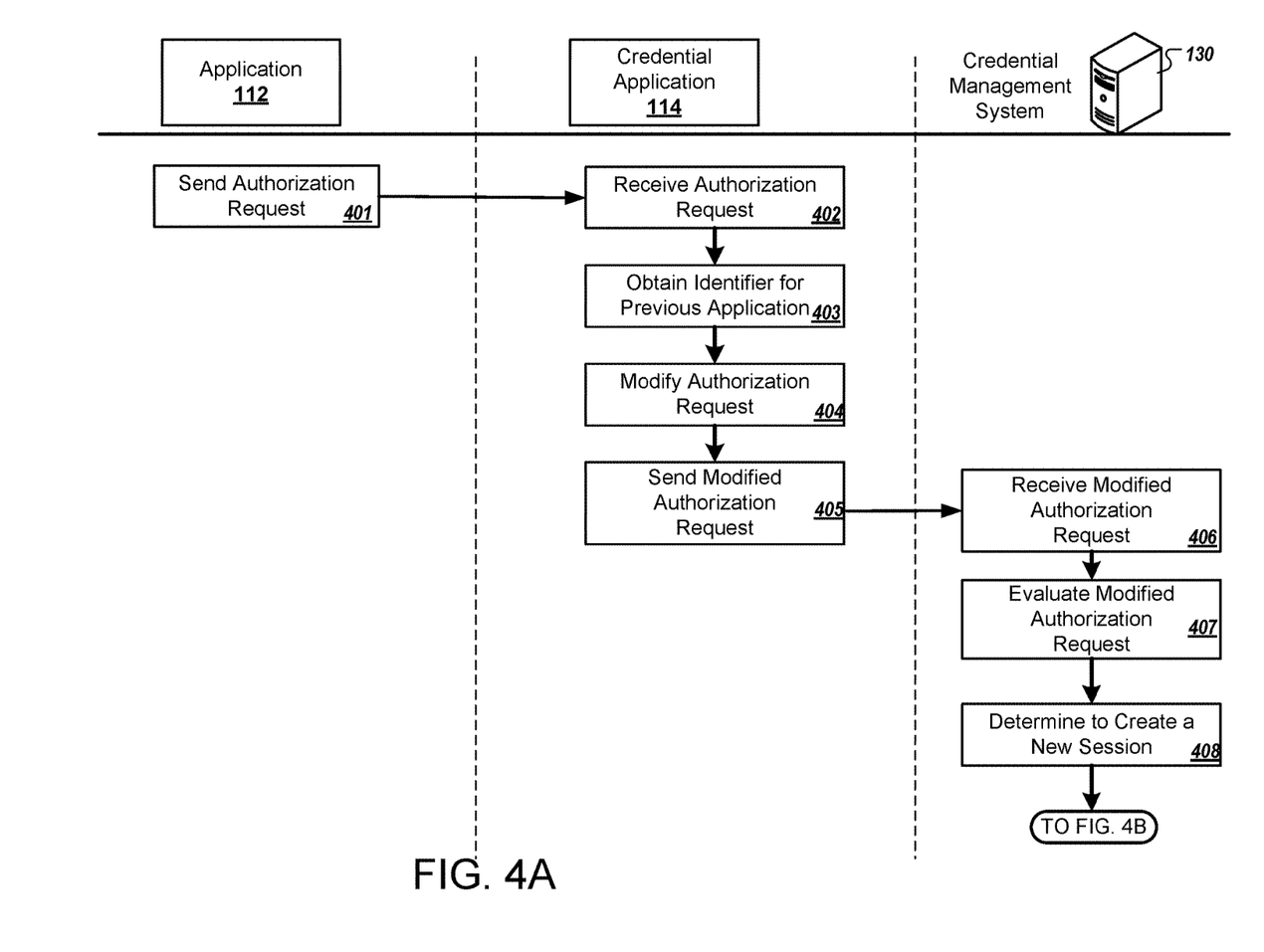
FIGS. 4A-4D illustrate examples of interactions in a system for authenticating a user.

The application sends an authorization request (401). The authorization request may include, for example, a SAML authorization request and associated parameter values. The authorization request may include a code, such as data from a QR code, or other authentication data. In some implementations, the authentication data includes sufficient information to validate a credential of a user, e.g., a password, a QR code, etc., that the CMS 130 can evaluate to determine whether use of the credential should be permitted. In some implementations, the authorization request identifies a credential of the user, for example, a credential corresponding to the authentication data. The authorization request may be sent in response to a user initiating or requesting to login to the application or web page using the application 112 through a single sign on service. In response to the authorization request, the client device 110 switches to the credential application 114.

The credential application receives the authorization request (402), and then obtains an identifier for the application 112 that initiated the authorization request and caused the application switch (403). The credential application 114 can evaluate the identifier to determine if the application 112 has the appropriate capabilities to support the remainder of the enhanced login process. For example, the identifier may be compared with a predetermined set of identifiers that each correspond to different web browsers known to support the necessary functionality. The decision to proceed with the login process instead of using an alternative process can be made based on determining that the identifier indicates one of the applications indicated by the predetermined set of identifiers.

The credential application 114 modifies the authorization request by adding or altering a parameter value (404). The added or altered parameter value can indicate that the CMS 130 should create a new session to complete the authentication, e.g., indicating that the application 112 supports features needed to replace the current communication session with a new, more secure session. The credential application sends the modified authorization request to the CMS 130 over a network (405).

The CMS 130 receives the modified authorization request (406), and evaluates the parameter values indicated (407). For example, the CMS 130 determines, based on the content of the received request, whether to complete the authentication by creating a new session or by continuing to use an existing session. For example, the CMS 130 evaluates the request by interpreting a value, such as a flag or code, in the request to determine whether the application requesting the authentication can support the switch to a new secure session. In the example illustrated, the CMS 130 identifies the parameter indicating that a new session should be used, and thus determines to create a new session (408).

Figure 4B:
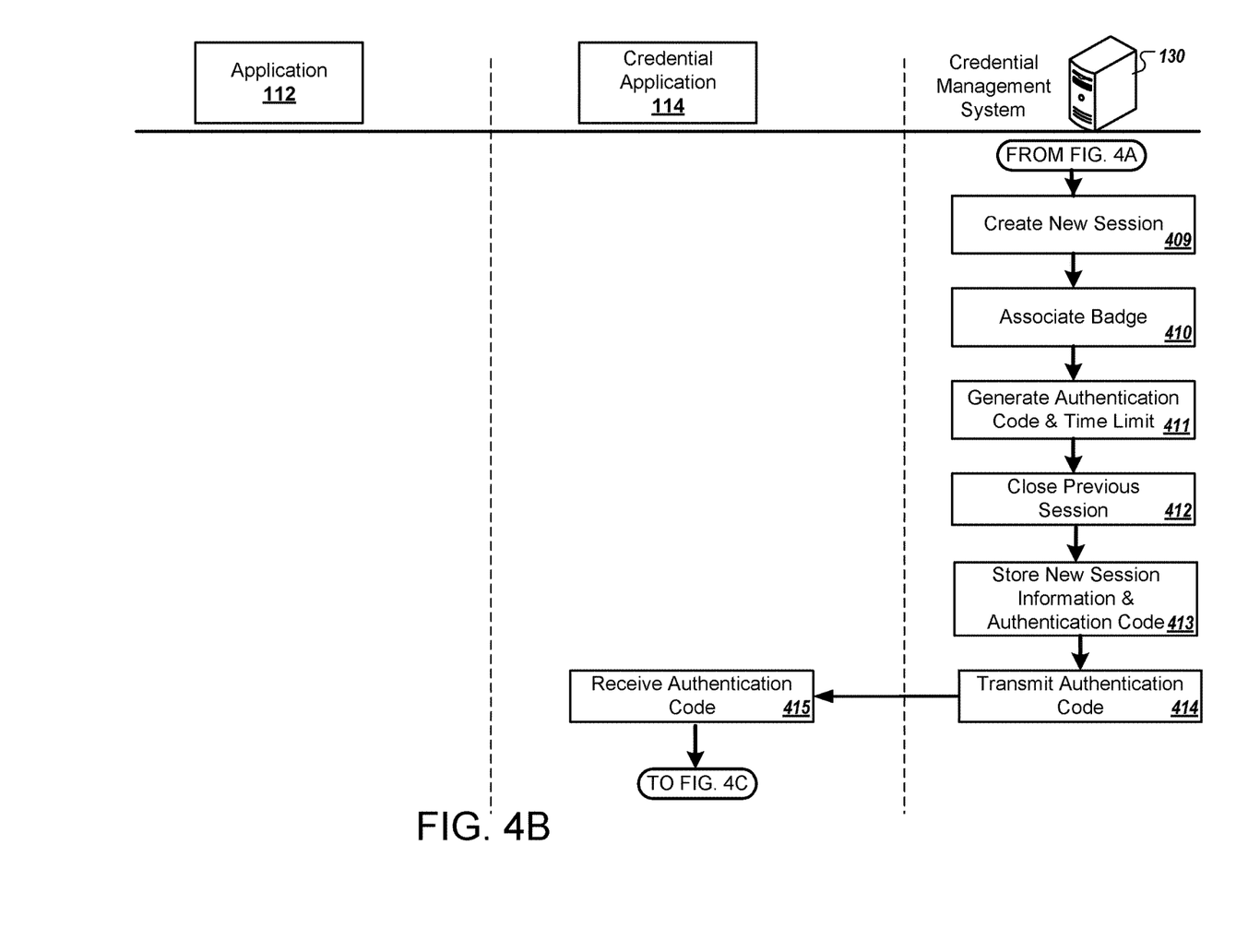

The CMS 130 creates a new, second communication session (409). The second communication session can have parameter values derived from the parameters of the first communication session. For examplet, the second communication session can be a substantial copy of the existing, first communication session associated with the authentication request. For example, the second communication session can include some or all of the same parameter values and the same SAML request information that are associated with the first communication session. The CMS 130 may set the referring IP address for the second communication session to be the referring IP address for the modified authentication request received from the credential application 114. As a result, if the first session had been compromised by an attacker and included a referring IP address for an attacker, the incorrect referring IP address would be replaced in the second communication session.

The CMS 130 associates the badge or credential that the user is attempting to use with the second communication session (410). The CMS 130 may associate the badge or credential with the second communication session by storing data that links the second communication session to the badge or credential. For example, the CMS 130 may store data that maps a session identifier for the second communication session to a credential identifier for the credential. In addition, or as an alternative, the CMS 130 may configure the second communication session so that attempts to use the second communication session are logged and reported as events related to the badge or credential.

The CMS 130 also generates an authentication code associated with the second communication session, and designates a time limit that indicates an expiration time for the authentication code (411). The CMS 130 also designates the first communication session as closed (412). The CMS 130 may close the first communication session, for example, at that time or soon thereafter. The CMS 130 stores the information about the new, second communication session, as well as the associated authorization code and time limit (413). The CMS 130 transmits the authorization code for the second session to the credential application 114 (414).

Figure 4C:
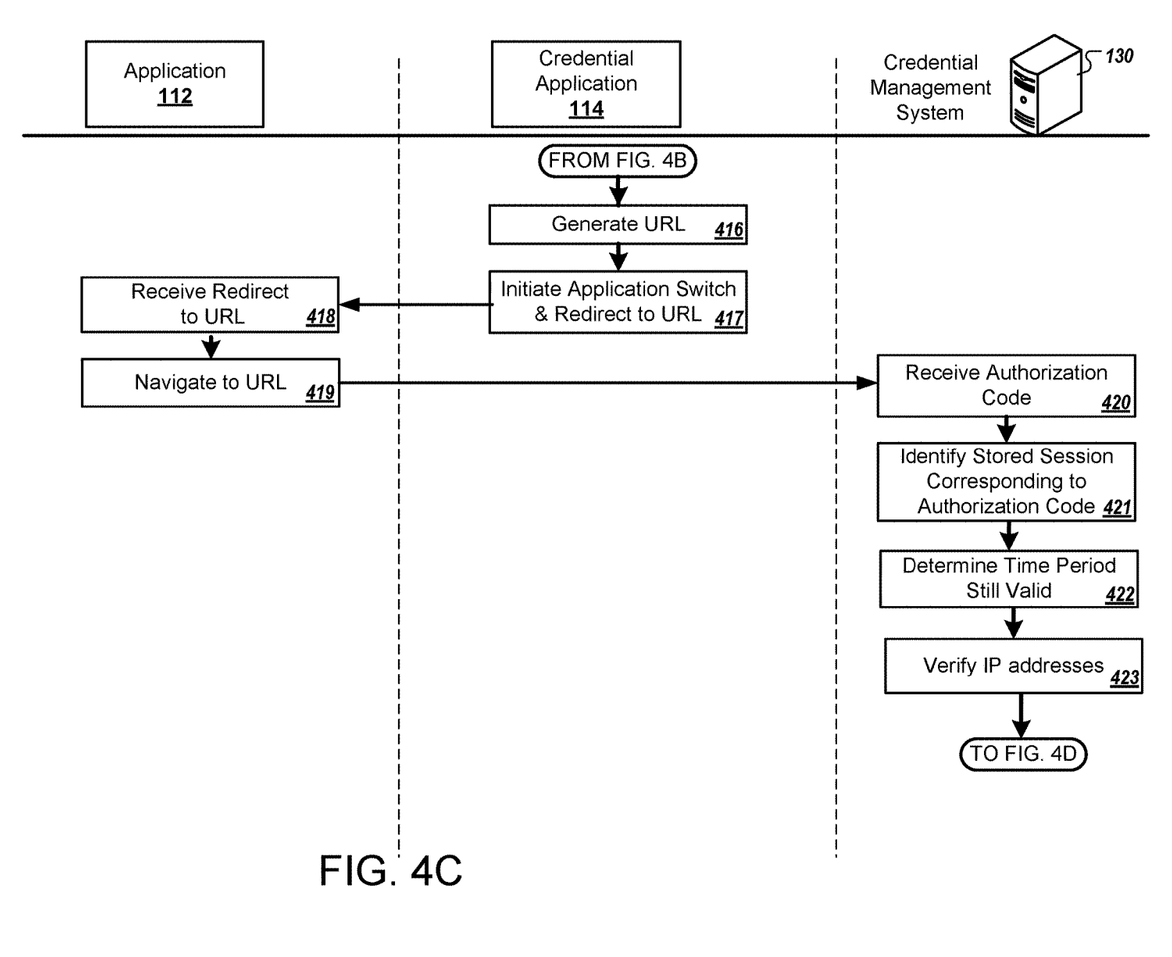

The credential application 114 receives the authorization code for the second communication session (415), and uses the code to generate a message or other data that will allow the application 112 to use the second communication session. For example, the credential application 114 can generate a URL (416) that points to an address hosted by the CMS 130 for providing access to the new communication sessions. The generated URL may include the authorization code as a parameter. The credential application 114 initiates an application switch so that the client device 110 switches back to the application 112 (417). For example, the credential application 114 may provide redirect instructions for the application to navigate to the URL that the credential application 114 generated.

The application 112 receives the redirect instructions and the generated URL (418), and navigates to the URL, using an HTTP request or other communication with the CMS 130 (419). In some implementations, the application 112 may be a web browser and may open the URL in a new tab.

The CMS 130 receives the request from the application 112, e.g., a request for a web page or other resource served by the CMS 130. In the request, the CMS 130 receives the authorization code for the second communication session (420). The CMS 130 searches among stored session information to identify the session information corresponding to the authorization code (421). Once the corresponding session is identified, the CMS 130 determines whether the time limit for using the authorization code has expired (422). If the time limit has expired, authentication is terminated and the application 112 does not receive information for the new session. If the time period for the authorization code has not expired, the CMS 130 proceeds with the process. The CMS 130 also verifies that the referring IP address of the request that included the authorization code matches the referring IP address stored in data for the identified stored session (423). This may verify, for example, that the client device 110 that is now requesting the new session is the same client device that has the credential application 114 that triggered the formation of the new session. If the referring IP addresses do not match, the CMS 130 may terminate the authentication process to prevent an attacker from gaining access to the new session at a device other than the client device 110. The CMS 130 invalidates the authorization code (424), which can prevent further access to the corresponding communication session by any other devices or applications. The CMS 130 then sends, to the application 112, (i) a new session cookie for the new, second session, and (ii) data causing the application 112 to be redirected to the new, second session.

Figure 4D:
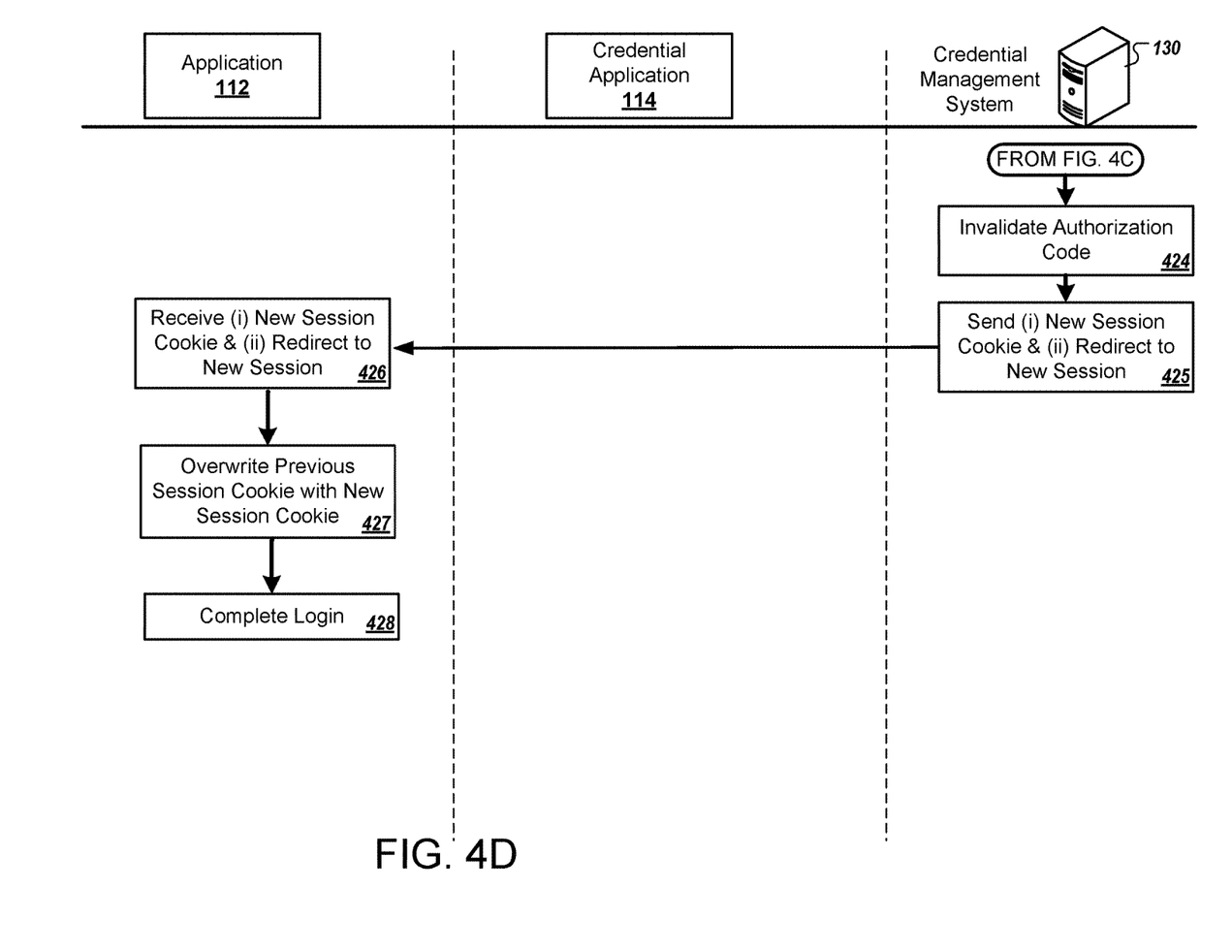

The application 112 receives the new session cookie and the redirection data (426), and overwrites the previous session cookie with the new session cookie (427). Web browsers and other applications may use the same session cookie for all tabs. Accordingly, attempts by an attacker to gain further access using the prior session will use codes and other data associated with the prior session cookie. This data will not correspond to the new session cookie, and attempts to gain access may be detected and blocked when the mismatch between codes and the session cookie occurs.

The application 112 may complete the authentication of the user's credential using the new session (428). For example, based on authentication data from the device, the CMS 130 may validate the credential of the user and designate the second communication session as an authenticated communication session. The CMS may validate the credential by, for example, verifying that a password, QR code, or other received data matches reference data for the credential (e.g., a shared secret like a password) or otherwise indicates that the user possesses the credential. Authentication data may be provided in the initial authorization request, or at another time. For example, the authorization data may be provided in the initial request, and the CMS 130 may validate the credential and proceed to create the second session in response to determining that the authentication data demonstrates the user is the one who has been issued the credential. As another example, the authentication data may be provided to the CMS 130 after the second communication session has been established, for example, with the authorization code for the second session. The CMS 130 and the application 112 may communicate directly through the second communication session, which the CMS 130 can designate as an authenticated session after the user's proof of possession of the credential has been verified.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any innovations or of what may be claimed, but rather as descriptions of features specific to particular embodiments of particular innovations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, at a user device, a request to access a resource over a network in a first communication session of the user device, wherein a first Internet Protocol (IP) address is associated with the first communication session;
   generating, by the user device, an authentication request that includes (i) a parameter indicative of a request for a second communication session different from the first communication session, and (ii) a second IP address for the second communication session, wherein the second IP address is different from the first IP address that is associated with the first communication session;
   transmitting, by the user device, the authentication request to a server system;
   receiving, by the user device, a response to the authentication request from the server system that includes information enabling access to the resource in the second communication session; and
   after receiving the response to the authentication request and in response to the request to access the resource in the first communication session, providing, by the user device, access to the resource in the second communication session instead of in the first communication session.

2. The computer-implemented method of claim 1, further comprising:
   generating, by the user device, a Uniform Resource Locator based on the received information enabling access to the resource,
   wherein providing access to the resource comprises accessing, by the user device and using the second communication session, the resource using the Uniform Resource Locator.

3. The computer-implemented method of claim 1, wherein:
   receiving the request to access the resource comprises receiving the request to access the resource through a first interface of a first application of the user device; and
   providing access to the resource in the second communication session comprises providing access to the resource in the second communication session through a second interface of the first application that is different than the first interface of the first application.

4. The computer-implemented method of claim 3, further comprising:
   terminating the first interface of the first application opened for the first communication session prior to generating the second interface of the first application.

5. The computer-implemented method of claim 3, wherein:
   the authentication request is transmitted using the second application;
   the information enabling access to the resource is received using the second application;
   the resource comprises a web page;
   the first application is a web browser; and
   the second application is a credential management application.

6. The computer-implemented method of claim 3, further comprising:
   obtaining, by the second application, an identifier that identifies the first application; and
   storing the identifier that identifies the first application.

7. The computer-implemented method of claim 6, further comprising:
   comparing the identifier that identifies the first application with a predetermined set of identifiers; and
   determining that the first application is configured to access the resource based on the identifier that identifies the first application being included in the predetermined set of identifiers.

8. The computer-implemented method of claim 3, further comprising:
   in response to receiving the request to access the resource:
      triggering execution of a second application of the user device; and
      transmitting a first authentication request from the first application to the second application.

9. The computer-implemented method of claim 8, further comprising:
   determining that the user device has switched focus from the first application to the second application; and in response to determining that the user device has switched focus from the first application to the second application, generating the authentication request by modifying a value of a parameter for the first authentication request.

10. A system comprising one or more computers and one or more storage devices storing instructions that, when executed by the one or more computers, cause the one or more computers to perform operations comprising:
receiving a request to access a resource over a network in a first communication session of a user device, wherein a first Internet Protocol (IP) address is associated with the first communication session;
generating an authentication request that includes (i) a parameter indicative of a request for a second communication session different from the first communication session, and (ii) a second IP address for the second communication session, wherein the second IP address is different from the first IP address that is associated with the first communication session;
transmitting the authentication request to a server system;
receiving, from the server system, a response to the authentication request that includes information enabling access to the resource in the second communication session; and
after receiving the response to the authentication request and in response to the request to access the resource in the first communication session, providing access to the resource in the second communication session instead of in the first communication session.

11. The system of claim 10, wherein the operations further comprise:
generating a Uniform Resource Locator based on the received information enabling access to the resource, wherein providing access to the resource comprises accessing, in the second communication session, the resource using the Uniform Resource Locator.

12. The system of claim 10, wherein:
receiving the request to access the resource comprises receiving the request to access the resource through a first interface of a first application of the user device; and
providing access to the resource in the second communication session comprises providing access to the resource in the second communication session through a second interface of the first application that is different than the first interface of the first application.

13. The system of claim 12, wherein:
the authentication request is transmitted using the second application;
the information enabling access to the resource is received using the second application;
the resource comprises a web page;
the first application is a web browser; and
the second application is a credential management application.

14. The system of claim 12, wherein the operations further comprise:
obtaining, by the second application, an identifier that identifies the first application;
storing the identifier that identifies the first application;
comparing the identifier that identifies the first application with a predetermined set of identifiers; and
determining that the first application is configured to access the resource based on the identifier that identifies the first application being included in the predetermined set of identifiers.

15. The system of claim 12, wherein the operations further comprise:
in response to receiving the request to access the resource:
triggering an execution of a second application of the user device; and
transmitting a first authentication request from the first application to the second application; and
determining that the user device has switched focus from the first application to the second application; and
in response to determining that the user device has switched focus from the first application to the second application, generating the authentication request by modifying a value of a parameter for the first authentication request.

16. One or more non-transitory computer-readable storage media comprising instructions, which, when executed by one or more computers, cause the one or more computers to perform operations comprising:
receiving a request to access a resource over a network in a first communication session of a user device, wherein a first Internet Protocol (IP) address is associated with the first communication session;
generating an authentication request that includes (i) a parameter indicative of a request for a second communication session different from the first communication session, and (ii) a second IP address for the second communication session, wherein the second IP address is different from the first IP address that is associated with the first communication session;
transmitting the authentication request to a server system;
receiving, from the server system, a response to the authentication request that includes information enabling access to the resource in the second communication session; and
after receiving the response to the authentication request and in response to the request to access the resource in the first communication session, providing access to the resource in the second communication session instead of in the first communication session.

17. The one or more non-transitory computer-readable storage media of claim 16, wherein the operations further comprise:
generating a Uniform Resource Locator based on the received information enabling access to the resource, wherein providing access to the resource comprises accessing, in the second communication session, the resource using the Uniform Resource Locator.

18. The one or more non-transitory computer-readable storage media of claim 16, wherein:
receiving the request to access the resource comprises receiving the request to access the resource through a first interface of a first application of the user device; and
providing access to the resource in the second communication session comprises providing access to the resource in the second communication session through a second interface of the first application that is different than the first interface of the first application.

19. The one or more non-transitory computer-readable storage media of claim 18, wherein:
the authentication request is transmitted using the second application;
the information enabling access to the resource is received using the second application;
the resource comprises a web page;
the first application is a web browser; and the second application is a credential management application.

20. The one or more non-transitory computer-readable storage media of claim 18, wherein the operations further comprise:
    obtaining, by the second application, an identifier that identifies the first application;
    storing the identifier that identifies the first application;
    comparing the identifier that identifies the first application with a predetermined set of identifiers; and
    determining that the first application is configured to access the resource based on the identifier that identifies the first application being included in the predetermined set of identifiers.

* * * * *